(12) United States Patent
Laing

(10) Patent No.: US 7,854,599 B2
(45) Date of Patent: Dec. 21, 2010

(54) CIRCULATING PUMP AND METHOD FOR THE FLUID LUBRICATION OF A SPHERICAL BEARING IN AN ELECTRIC MOTOR

(75) Inventor: Oliver Laing, Stuttgart (DE)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 1391 days.

(21) Appl. No.: 11/123,334

(22) Filed: May 5, 2005

(65) Prior Publication Data

US 2006/0285985 A1    Dec. 21, 2006

(30) Foreign Application Priority Data

May 7, 2004    (DE) .................... 10 2004 023 790

(51) Int. Cl.
  *F04B 35/04* (2006.01)
  *F04B 39/02* (2006.01)
(52) U.S. Cl. ............. 417/423.11; 417/366; 417/423.12; 417/423.13; 384/108
(58) Field of Classification Search ............ 384/108, 384/245, 610; 417/366, 423.11, 423.12, 417/423.13
See application file for complete search history.

(56) References Cited

U.S. PATENT DOCUMENTS 4,730,989 A * 3/1988 Laing .................... 417/357
4,938,121 A * 7/1990 Melchior .................. 92/110

FOREIGN PATENT DOCUMENTS

| DE | 37 01 562 A1 | 9/1987 |
| DE | 195 48 471 C1 | 6/1997 |
| DE | 196 29 843 A1 | 1/1998 |
| DE | 100 59 458 A1 | 6/2002 |

* cited by examiner

*Primary Examiner*—Devon C Kramer
*Assistant Examiner*—Philip Stimpert
(74) *Attorney, Agent, or Firm*—RatnerPrestia

(57) ABSTRACT

A circulating pump with an electric motor, which comprises a rotor and a stator, is proposed, the rotor being mounted on a spherical bearing which comprises a sliding body with a convex spherical surface and a bearing bushing with a concave spherical surface and which is fluid-lubricated, in which pump a flow system for passing lubricating fluid through a lubricating region between the sliding body and the bearing bushing is separate from a gap between the stator and the rotor.

41 Claims, 5 Drawing Sheets

CIRCULATING PUMP AND METHOD FOR THE FLUID LUBRICATION OF A SPHERICAL BEARING IN AN ELECTRIC MOTOR

CROSS-REFERENCE TO RELATED PATENT APPLICATIONS

The present disclosure relates to the subject matter disclosed in German application number 10 2004 023 790.5 of May 7, 2004, which is incorporated herein by reference in its entirety and for all purposes.

BACKGROUND OF THE INVENTION

The invention relates to a circulating pump with an electric motor, which comprises a rotor and a stator, the rotor being mounted on a spherical bearing which comprises a sliding body with a convex spherical surface and a bearing bushing with a concave spherical surface and which is fluid-lubricated.

The invention also relates to a method for the fluid lubrication of a spherical bearing with a sliding body and a bearing bushing in an electric motor.

Spherical bearings have the advantage that they are self-adjusting, in particular in connection with fluid lubrication, so that wear does not lead to increased bearing clearance.

SUMMARY OF THE INVENTION

In accordance with an embodiment of the invention, a circulating pump is provided with optimized bearing lubrication.

In accordance with an embodiment of the invention, a flow system (flow conducting arrangement) for passing lubricating fluid through a lubricating region between the sliding body and the bearing bushing being separate from a gap between the stator and the rotor is provided.

The gap between the stator and the rotor is also referred to as the air gap, since the stator and the rotor are electromagnetically coupled to each other via this gap. This electromagnetic coupling drives the rotational movement of the rotor. Lubricating fluid ma be passed through this air gap. (The term air gap is retained here, although lubricating fluid and, in particular, water may be located in this gap.)

According to an embodiment of the invention, it is provided that the flow system for the lubricating fluid avoids this gap. As a result, the bearing lubrication becomes independent of the air gap flow.

Some of the liquid that is delivered by the circulating pump is used as the lubricating fluid. This fluid may contain contaminants. The contaminants in themselves are unproblematic. Since, however, high magnetic forces can act between the stator and the rotor, magnetic particles such as magnetic iron particles may be deposited there. An accumulation of such particles can lead to blockage of the circulating pump. The solution according to embodiments of the invention avoids, or at least greatly reduces, fluid being passed through this critical gap region. This avoids the problem of the accumulation of magnetic particles. According to an embodiment of the invention, a flow system which indeed avoids the gap is chosen. It is then also unnecessary for filters for (magnetic) particles to be provided.

The fact that the air gap has a radial extent means that it may create an inherently frictional pump, which has a certain delivery height (delivery head). The frictional pump is, in this case, substantially independent of the operating point. By contrast, the delivery height of an impeller driven by means of the rotor is dependent on the operating point. With an increasing delivery height, the frictional pump becomes more powerful in comparison with the impeller, the frictional pump operating against the pressure of the impeller. There is a point at which the frictional pump has the same delivery height as the impeller. Adequate bearing lubrication can then no longer be guaranteed, i.e. uncontrollable conditions arise. In accordance with embodiments of the invention, on the other hand, the transport of lubricating fluid for the lubrication of the bearing through the (air) gap is avoided, or at least greatly reduced, so that the bearing lubrication is no longer associated with the delivery height and the operating point. Uncontrollable conditions of the kind described with respect to the bearing lubrication therefore cannot arise.

A flow system that bypasses the gap between the stator and the rotor can be realized in a simple way.

The flow system advantageously bypasses the gap between the stator and the rotor. It is preferably taken past the gap between the stator and the rotor.

The flow system is advantageously formed in such a way that lubricating fluid can be supplied to the lubricating region via the rotor and removed from it via the rotor. Lubricating fluid can then be introduced into and extracted from the lubricating region directly, without the flow having to pass through the air gap between the stator and the rotor.

In particular, the flow system is formed on the rotor, in order thereby to be able to bypass the air gap in a simple way.

It is provided that the flow system comprises one or more flow channels, which are disposed in the rotor. This allows lubricating fluid to be supplied to the lubricating region directly, without it being necessary for it to pass through the gap between the stator and the rotor.

It is particularly advantageous if the flow system comprises one or more supply channels for supply of lubricating fluid into the lubricating region, which channels are formed in the rotor. The lubricating region is formed between the rotor, formed in particular as a rotor shell, and the sliding body. Lubricating fluid can be introduced directly into the lubricating region through supply channels in the rotor.

The lubricating region is advantageously closed at the end between the sliding body and the bearing bushing, i.e. toward the end of a region between the sliding body and the bearing bushing at which lubricating fluid could escape there is an appropriate termination, which largely prevents the escape of lubricating fluid. As a result it is once again possible to provide a flow system which bypasses the gap between the stator and the rotor.

In particular, the lubricating region is closed toward a holder for the sliding body. The holder for the sliding body (and the sliding body) is rotationally fixed with respect to the stator. It can therefore be in effective fluidic connection with the gap between the stator and the rotor. The termination achieves the effect that the air gap is at least largely free from flow.

In particular, the lubricating region is adjoined, away from the bearing bushing, by a space, the lubricating region being sealed with respect to the space. The seal does not necessarily have to be perfect. It may be permissible for the lubricating fluid to enter into the space. As a result, the space, which is in connection with the gap between the stator and the rotor, can gradually fill with fluid, or fluid can pass from the space into the lubricating region. However, the volumetric throughflow is negligible in comparison with the volumetric throughflow through the flow system according to embodiments of the invention which bypasses the gap between the stator and the rotor. The proportion of fluid which flows through the air gap is therefore negligible in comparison with the proportion of fluid which flows through the lubricating region on account of the flow system according to embodiments of the invention. This largely avoids the problem of the accumulation of magnetic particles in the air gap.

In one embodiment, the sliding body is partly located in the space. This space makes it possible for the rotor to rotate with respect to the stator.

In a particular embodiment, a holder for the sliding body is at least partly disposed in the space. This ensures that the rotor, which is mounted in the spherical bearing, can rotate freely in relation to the stator.

In a particular embodiment, the space is in effective fluidic connection with the gap between the stator and the rotor. If the sealing of the lubricating region with respect to the space is not perfect, lubricating fluid can penetrate into the gap and gradually accumulate there. The water penetrating into the space then does not have to be removed. At the same time, however, it can be ensured that the volumetric throughflow of fluid through the gap between the stator and the rotor is minimal.

It is particularly advantageous if a seal is provided for sealing the lubricating region in relation to the space. The volumetric throughflow of fluid, and in particular lubricating fluid, through the gap between the stator and the rotor can be minimized as a result.

In a particular embodiment, the seal has a peripheral edge facing the sliding body. Sealing in relation to the sliding body can be achieved by means of this peripheral edge.

It is particularly advantageous if the seal engages against the sliding body. This provides a corresponding sealing effect and the volumetric throughflow of lubricating fluid through the seal can be minimized.

In the case of one embodiment, the seal is formed integrally with the bearing bushing. The bearing bushing is then formed in such a way that, in a sealing region, it engages against the sliding body with a peripheral edge, so that the passage of lubricating fluid between the bearing bushing and the sliding body is minimized.

At least one sealing element for sealing the lubricating space may be alternatively or additionally provided, the sealing element being a sealing element that is separate from the bearing bushing. For example, a Teflon® ring may be used.

In principle it is possible for the sealing element to be connected to the rotor outside the bearing bushing. It is advantageous if the sealing element is located on the bearing bushing. It can be fixed there in a simple manner. In principle, it would also be possible to fix the sealing element non-rotatably on the sliding body. The rotor then rotates with respect to the sealing element. It is advantageous, however, if the sealing element is fixed on the rotor and rotates with the latter with respect to the sliding body.

The sealing element is formed, for example, as a sealing ring (O-ring).

It may be provided that the seal is disposed on the near side of an equatorial plane of the sliding body, i.e. the bearing bushing does not extend beyond the equatorial plane, and the seal also does not extend beyond it. This has the advantage that the seal can adjust itself when the sliding body "digs" further into the bearing bushing. (Spherical bearings have the advantage that, if formed appropriately, the wear is likewise spherical, i.e. the spherical relationship between the bearing body and the bearing bushing is also maintained in spite of the wear. This has the overall result of optimum sealing and optimum bearing lubrication for the overall system comprising the bearing bushing and the sliding body.)

It is also possible for the seal to be disposed on the far side of an equatorial plane of the sliding body. It is disposed in this way, for example, if a separate sealing element is provided.

It is advantageous if one or more flow channels open out into the lubricating region. Lubricating fluid can then be supplied/removed via these channels.

At least one flow channel can then be directed laterally into the lubricating region. Lubricating fluid can then be introduced, it being possible for the lubricating region to be closed with respect to a free space (which is in connection with the gap between the stator and the rotor). In a particular embodiment, an orifice of the at least one flow channel with which the latter opens out into the lubricating region is aligned transversely in relation to an axis of rotation of the rotor. A throughflow of the lubricating region, and consequently optimized fluid lubrication, can then be achieved.

It is also advantageous if the at least one flow channel is disposed in the bearing bushing and/or on the bearing bushing. Lubricating fluid can then be introduced into the lubricating region through the rotor, and in particular through the bearing bushing. If a separate sealing element is provided, it is then sufficient in principle if the at least one flow channel is produced by means of appropriate surface formation of the bearing bushing on a surface facing the sealing element.

It is particularly advantageous if an orifice of the at least one flow channel via which lubricating fluid can flow into the flow channel is in effective fluidic connection with a pressure region of the circulating pump. It is then provided that lubricating fluid (as part of the fluid delivered by the circulating pump) is transported through the flow channel, and consequently through the lubricating region.

It is also advantageous if a lubricating opening is formed in the bearing bushing. In particular, the lubricating opening is aligned with an axis of rotation of the rotor. It is produced by means of a central region that is free of material. If the central region that is free of material has appropriate dimensions, it can also be ensured by this means that the wear of the bearing is spherical.

It is particularly advantageous if the lubricating opening is in effective fluidic connection with a suction region of the circulating pump. This allows automatic transport of lubricating fluid through the flow system to be achieved, in order in this way to provide transport of lubricating fluid through the lubricating region.

It is also advantageous if a covering is provided for the gap between the stator and the rotor. This allows the volumetric throughflow of fluid through the gap between the stator and the rotor to be minimized. If the covering is appropriately disposed, it is also possible to avoid the fluid being taken directly past magnetic regions of the rotor outside the air gap.

The volumetric throughflow through the gap between the stator and the rotor can be kept small if a covering is provided between an impeller and the electric motor. The covering prevents the liquid from flowing through the gap, or at least reduces the volumetric proportion of fluid that can flow through the gap. Such a covering can be formed in a simple way, for example in the form of a separating plate. The separating plate covers over the gap at its end facing the pressure region toward an impeller space. The covering can be formed in such a way as not to affect the freedom of movement of the rotor with respect to the stator.

In a particular embodiment, a separating space is formed between the covering and the electric motor. This allows the flow of fluid through the (air) gap to be kept low in a simple way while ensuring the rotatability of the rotor.

The flow system is advantageously in effective fluidic connection with a pressure region of the circulating pump and in effective fluidic connection with a suction region, lubricating fluid being able to flow through the lubricating region via at least one flow channel. The connection with the pressure region and the suction region allows for fluid lubrication of the spherical bearing independently of the operating parameters of the electric motor.

In the case of the circulating pump according to an embodiment of the invention, a bearing region of the spherical bearing is preferably disposed between the electric motor and an impeller. This disposition relates to the direction of the axis of rotation. The bearing region is that spherical region in which the bearing bushing slides on the sliding body.

In the case of one exemplary embodiment, an opening may be provided between a space in which a holder for the sliding body is at least partly disposed and a separating space, the separating space lying beneath an impeller space. The separating space is delimited with respect to the impeller space, for example, by a covering. In the case of a frictional pump, fluid can penetrate into this space through this opening, in order to improve the cooling of the stator and/or rotor. In cooperation with a covering, a kind of closed circuit can then be formed by the space, the air gap and a space between a covering and the rotor.

In accordance with an embodiment of the invention, a method for the fluid lubrication of a spherical bearing with a sliding body and a bearing bushing in an electric motor is provided which functions under all operating parameters of the electric motor and all system pressures.

In accordance with an embodiment of the invention, a flow path for lubricating fluid into a lubricating region between the sliding body and the bearing bushing is provided and a flow path for lubricating fluid through an air gap of the electric motor is blocked.

The method in accordance with an embodiment of the invention has the advantages already explained in connection with the circulating pump in accordance with an embodiment of the invention.

Further advantageous constructions have already been explained in connection with the circulating pump in accordance with embodiments of the invention.

In a particular embodiment, a flow path through a rotor of the electric motor is provided and a flow path between the rotor and a stator is blocked. This allows bearing lubrication to be achieved while bypassing the air gap.

The following description of preferred exemplary embodiments serves for a more detailed explanation of the invention in connection with the drawings.

DETAILED DESCRIPTION OF CERTAIN EMBODIMENTS

Figure 1:
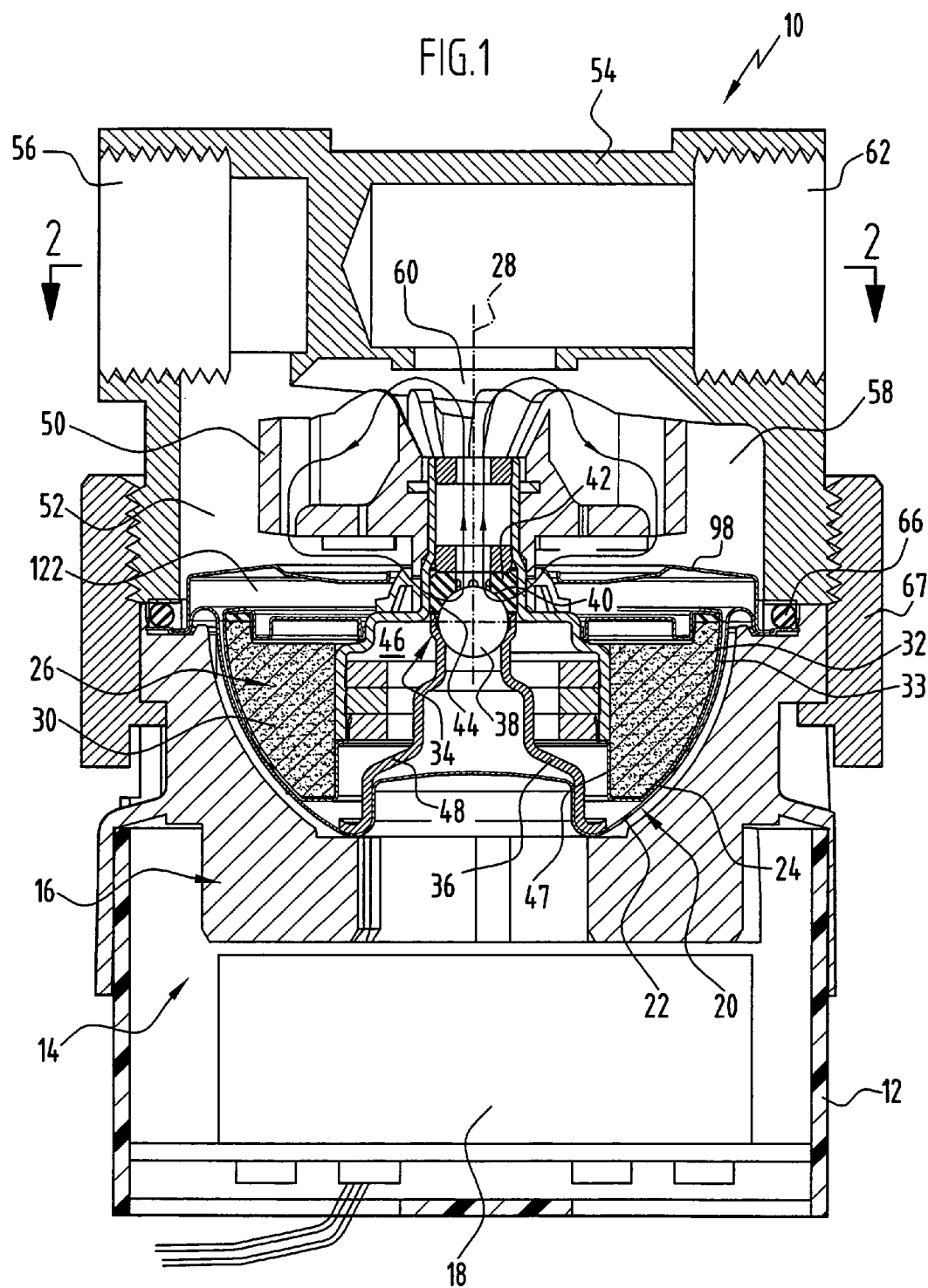
FIG. 1 shows a lateral sectional view of an exemplary circulating pump according to an embodiment of the invention.
Figure 2:
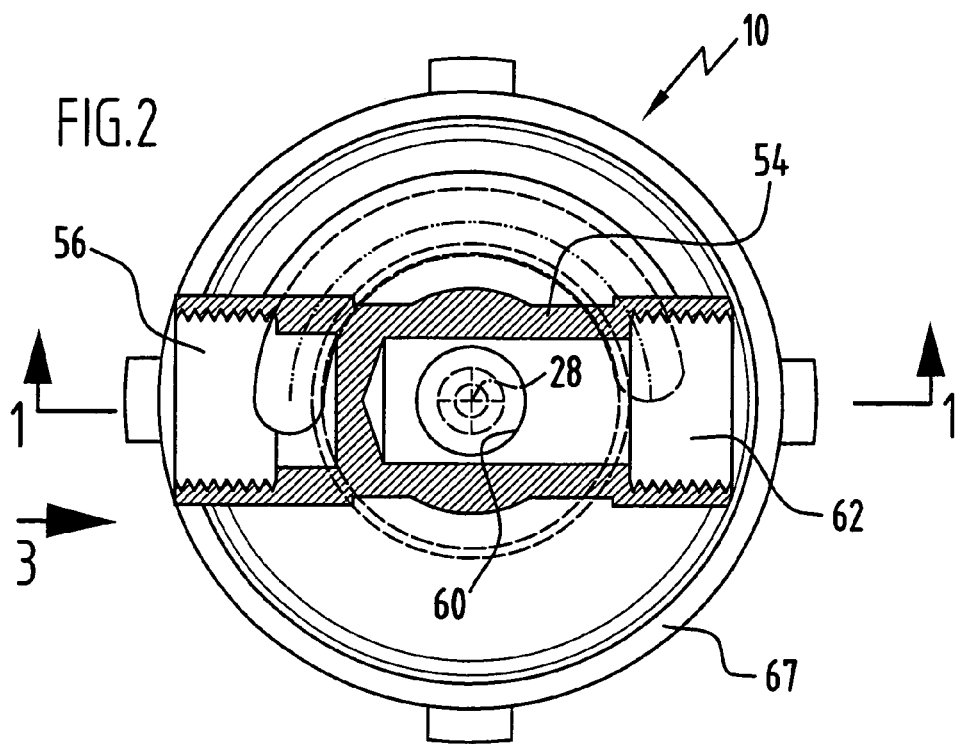
FIG. 2 shows a view along the line 2-2 according to FIG. 1.
Figure 3:
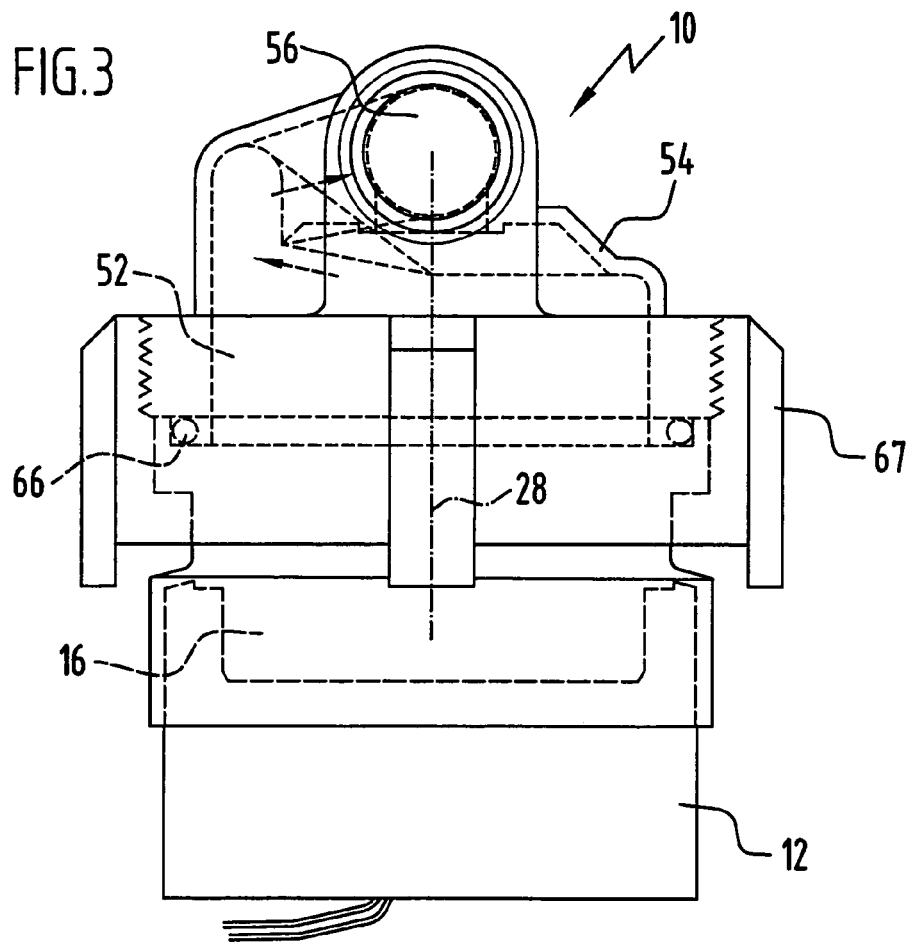
FIG. 3 shows a side view in the direction 3 according to FIG. 2.

An exemplary circulating pump according to an embodiment of the invention, which is shown in FIGS. 1 to 3 and is designated there as a whole as reference numeral 10, comprises a first housing 12 (motor housing), in which an electric motor designated as a whole by reference numeral 14, is disposed.

This electric motor 14 has a stator 16, which comprises a plurality of coils (not shown in the drawing). These coils can be driven by means of a drive circuit 18. For example, they are electronically commutated. The stator 16 is protected from the effect of fluid by a separating cap 20. This separating cap 20 surrounds the stator 16 and seals it in the housing 12.

The separating cap 20 has a region 22 with a spherically concave surface. Defined in turn by this region 22 is a spherical portion region 24, in which a rotor 26 is disposed rotatably about an axis of rotation 28.

The axis of rotation 28 in this case passes through a spherical center point of the (imaginary) sphere, which defines the spherical portion region 24.

The rotor 26 has, for example, a plurality of permanent magnets 30. It is formed in a spherically convex manner in the region 22 of the separating cap 20 facing the stator 16. The permanent magnets 30 are protected against the effect of fluid by means of a casing 32. Facing the separating cap 20, the casing 32 is formed in a spherically convex manner. Formed between the rotor 26 and the stator 16 is an air gap 33, which is delimited by the casing 32 and the separating cap 20. This air gap 33 has the form of a spherical shell in the region of the spherical surfaces of the separating cap 20 and the casing 32.

For mounting the rotor 26 in the housing 12, a spherical bearing 34 is provided. This spherical bearing 34 comprises a holder 36 formed as a bearing column, which is fixed in place with respect to the housing 12. For example, the holder 36 is formed as a metal column, the corresponding metal parts being connected to the separating cap 20. The holder 36 may also be formed integrally with the separating cap 20.

It is also possible in principle for the holder 36 to be produced from a plastics material.

The holder 36 holds a sliding body 38, which is formed in particular as a sphere. This sliding body 38 is produced from a hard material, such as a ceramic material for example. It has a spherically convex surface 40, on which a bearing bushing 42 of the rotor 26 slides. The bearing bushing 42 of the rotor 26 has for this purpose a spherically concave surface 44, which is adapted to the spherically convex surface 40 of the sliding body 38. A spherical bearing region is then formed.

The bearing bushing 42 is, for example, produced from carbon.

The axis of rotation 28 of the rotor 26 passes through the spherical center point of the sliding body 38.

Formed on the rotor 26 is a free space 46, so that the rotor 26 is formed as a shell ("rotor shell") and can be placed on the sliding body 38, which in turn is located on the holder 36. With the rotor 26 mounted in the spherical bearing 34, the holder 36 lies at least partly in this free space 46. The sliding body 38 then likewise partly lies in this free space 46.

The permanent magnets 30 are sealed by separating walls 47.

The walls 48, which form the holder 36, are connected in particular to the casing 32 and may be formed integrally with it.

Located fixedly on the rotor 26 is an impeller 50. When the rotor 26 rotates about the axis of rotation 28, this impeller 50 likewise rotates about the axis of rotation 28, this rotation of the impeller 50 allowing a circulation of fluid to be brought about.

With respect to the axis of rotation 28, the spherical bearing region of the spherical bearing 34 is located between the impeller 50 and the electric motor 14.

The impeller 50 is disposed in an impeller space 52 of a second housing 54 (pump housing). The second housing 54 is located on the first housing 12. Fluid can be supplied to the impeller space 52 and removed from it via the second housing 54.

The second housing 54 has a first connection 56, via which fluid can be removed from the impeller space 52. This first connection 56 is thereby in effective fluidic connection with a pressure region 58 of the second housing 54. Fluid present in the pressure region 58 is under positive pressure with respect to a suction region 60.

The housing 54 also has a second connection 62, via which fluid can be supplied. The second connection 62 is in effective fluidic connection with the suction region 60 of the circulating pump 10. The suction region 60 and the pressure region 58 are defined by the way in which the impeller 50 is disposed and formed in the impeller space 52. In the case of the exemplary embodiment shown, the pressure region 58 surrounds the sides of the impeller 50 in an annular manner. The suction region 60 lies above the impeller 50.

The second housing 58 is placed on the first housing 12. For fluid sealing, a seal 66 is provided, for example in the form of an O-ring. The two housings 12 and 54 can be connected to each other by means of a flange ring 67.

The spherical bearing 34 is fluid-lubricated with the circulating fluid (delivered fluid). For this purpose, lubricating fluid is introduced into a lubricating region 68 (FIG. 4) in the region between the sliding body 38 and the bearing bushing 42. According to an embodiment of the invention, it is provided that the lubricating region 68 is sealed with respect to the free space 46.

The free space 46 is in effective fluidic connection with the air gap 33. By the sealing of the lubricating region 68, a flow of fluid through the air gap 33 can be blocked, or at least largely avoided.

The bearing bushing 42 has at the lubricating region 68 a plurality of lubricating grooves, by which the wetting with lubricant is improved.

Figure 4:
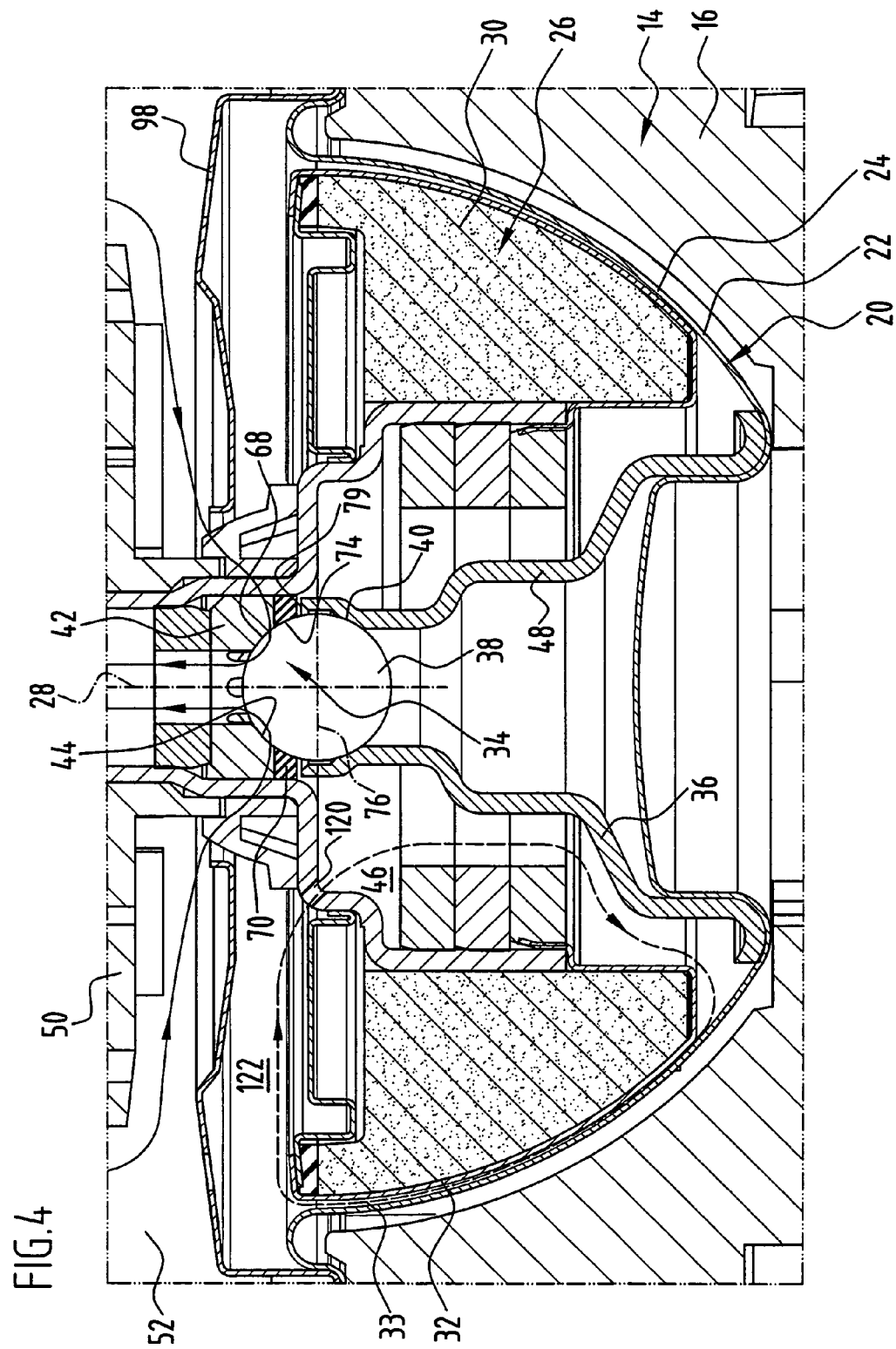
FIG. 4 shows an enlarged representation of a rotor of an electric motor of the circulating pump according to FIG. 1.
Figure 5:
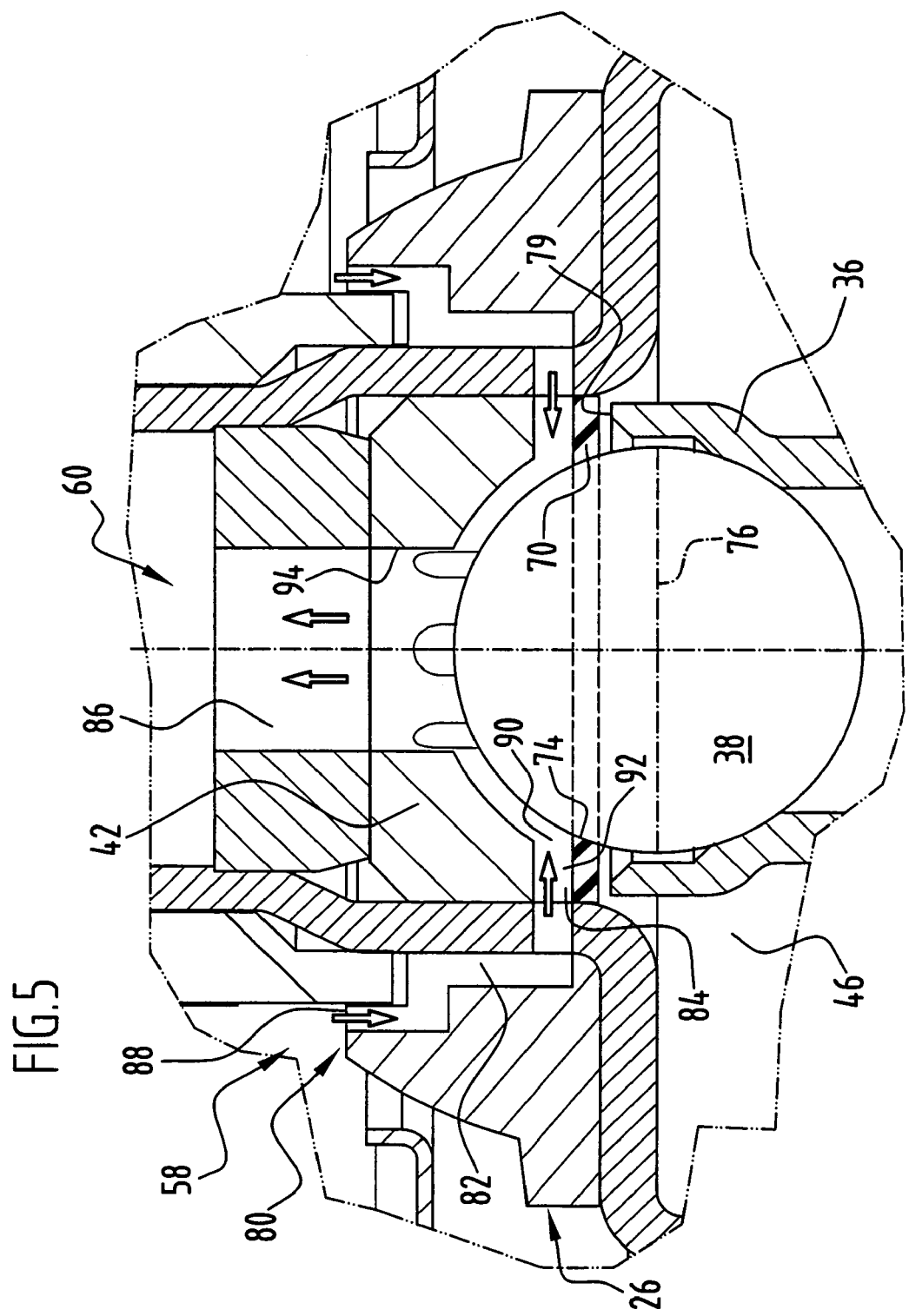
FIG. 5 shows a first exemplary embodiment of a flow system for the fluid lubrication of the rotor according to FIG. 4.

In the case of the exemplary embodiment shown in FIGS. 4 and 5, a sealing element 70 is provided for the sealing. Such a sealing element, which is formed in particular as a sealing ring, may be produced for example from Teflon.

In the case of the exemplary embodiment according to FIGS. 4, 5, the sealing element 70 is located on the bearing bushing 42. The sealing element 70 has, facing the sliding body 38, a peripheral edge 74, with which it engages against the sliding body 38, in order thereby to provide the sealing with respect to the free space 46.

The sealing element is disposed on the near side of an equatorial plane 76 of the sliding body 38, i.e. it does not protrude beyond this equatorial plane 76. This has the advantage that the sealing element 70 can adjust itself when there is a change in the relative position between the bearing bushing 42 and the sliding body 38.

It is also possible to provide a bearing bushing which protrudes beyond an equatorial plane of the sliding body 38 (not shown in the drawing). The sealing element is then located on the bearing bushing on the far side of the equatorial plane, i.e. closer to an end face 79 of the holder 36 than in the case of the exemplary embodiment according to FIGS. 4, 5.

It is also possible in principle for the sealing element 70 to be spaced apart from the bearing bushing 42 and thereby define the boundary between the free space 46 and the lubricating region 68.

In order to supply the lubricating region 68 with lubricating fluid and to allow lubricating fluid to pass through, a flow system 80 is provided. An example of how such a flow system may be formed is explained with reference to FIG. 5. The flow system 80 is formed on the rotor 26, so that the air gap 33 can be bypassed to pass lubricating fluid through the lubricating region 68. The flow system 80 has a plurality of flow channels 82. These comprise at least one supply channel 84, via which lubricating fluid is introduced into the lubricating region 68, and at least one removal channel 86, via which lubricating fluid can be removed from the lubricating region 68. This in turn allows lubricating fluid to be passed through the lubricating region 68, in order to provide fluid lubrication of the spherical bearing 34.

The at least one supply channel 84 has an (introduction) orifice 88, which is in effective fluidic connection with the pressure region 58 of the circulating pump 10. Fluid is then introduced into such a supply channel 84. This fluid forms lubricating fluid for the spherical bearing 34.

The at least one supply channel 84 is formed in the bearing bushing 42 and has a (delivery) orifice 90 into the lubricating region 68. The orifice 90 is in this case disposed laterally (with respect to the axis of rotation 28), i.e. the at least one supply channel 84 opens out laterally into the lubricating region 68. For this purpose, the supply channel 84 may comprise a transverse bore in the bearing bushing 42 (with respect to the axis of rotation 28) and/or a transverse recess 92 may be provided on a surface of the bearing bushing 42 that is facing the sealing element 70.

The transverse recess 92 may, for example, also be shaped in an annular manner, so that the lubricating region 68 can be supplied with lubricating fluid over its entire periphery.

A supply channel 84 may also have a plurality of such transverse bores or transverse recesses or be connected to a plurality of such transverse recesses.

The bearing bushing 42 has a central lubricating opening 94 (with respect to the axis of rotation 28). Lubricating fluid can be removed via this lubricating opening (which forms the removal channel 86 or is part of this removal channel 86). The lubricating opening 94 is in this case in effective fluidic connection with the suction region 60 of the circulating pump 10.

The flow system 80 allows lubricating fluid to pass through the lubricating region 68 without having to flow through the air gap 33. A covering 98 (FIGS. 1 and 4) is provided between the impeller 50 and the rotor 26. This covering 98 is located, for example, in the first housing 12. This covering 98 is formed in particular as a separating plate. The covering 98 covers the air gap 33 in the upward direction toward the impeller space 52 and in particular toward the pressure region 58. As a result, the throughput of fluid flowing through the air gap 33 is blocked, or at least greatly reduced.

The covering 98 is disposed in such a way that the rotation of the rotor 26 and of the impeller 50 is not hindered. For example, the covering 98 is connected to the separating cap 20 of the stator 16 and reaches partly over the rotor 26, in order thereby to cover the gap 33.

In the case of the solution according to embodiments of the invention, the lubricating region 68 is supplied with lubricating fluid through the rotor 26, in order thereby largely to prevent flow through the air gap 33. It is allowed for fluid to collect in the air gap 33. However, the seal (by means of the sealing element 70) must be so tight that the volumetric throughflow of lubricating fluid through the lubricating region 68 is effected to a predominant extent, with the air gap 33 being bypassed.

If fluid flows through the air gap 33, there is then the fundamental problem that magnetic particles remain adhered on account of the magnetic forces prevailing there. Such an accumulation of magnetic particles may lead to blocking of the freedom of movement between the rotor 26 and the stator 16, and consequently blocking of the circulating pump 10. Since in the case of the solution according to embodiments of the invention, the volumetric throughput of fluid through the air gap 33 is blocked, or at least greatly reduced, the risk of the accumulation of magnetic particles is consequently also greatly reduced.

With circulating pumps known from the prior art, there is also the problem that, on account of an inherent frictional pump, the flow through the air gap 33 depends on the operating point. Uncontrollable conditions can thereby occur. The solution according to embodiments of the invention, in which the air gap 33 is bypassed with respect to the passage of fluid, has the effect that the bearing lubrication is independent of the operating point, and consequently of the delivery head.

The sealing element 70 is a seal that is separate from the bearing bushing 42.

Figure 6:
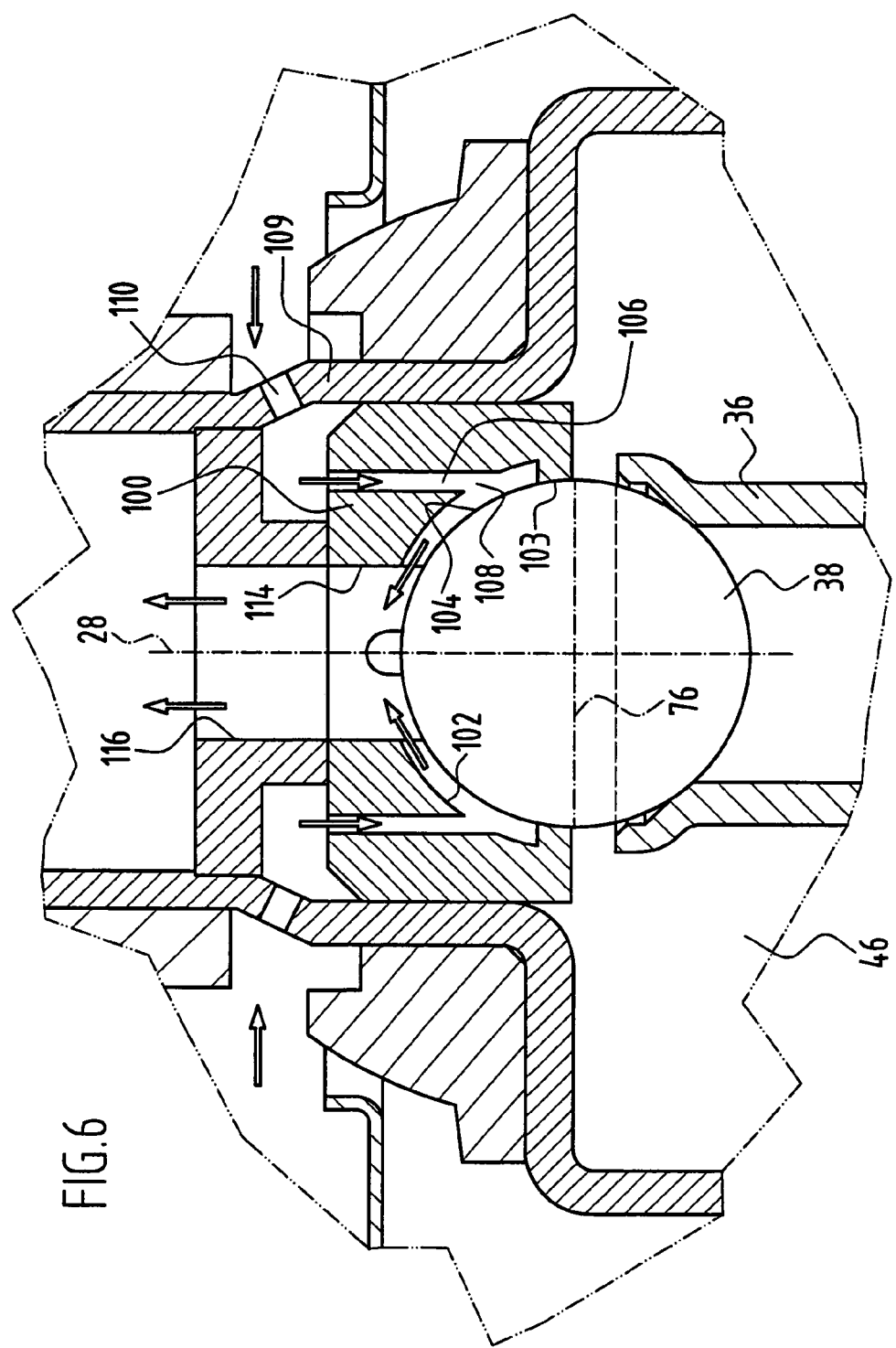
FIG. 6 shows a second exemplary embodiment of a flow system for fluid lubrication.

It may also be provided that seals of the lubricating region 68 with respect to the free space 46 are formed integrally on a corresponding bearing bushing 100 (FIG. 6). For this purpose, the bearing bushing has a spherical concave surface 102, which faces the sliding body 38. (The sliding body 38 and the holder 36 are in principle formed in the same way as described above, so the same reference numerals are used.) At its end facing the free space 46, the bearing bushing has a peripheral edge 103, with which it engages against the sliding body 38, in order thereby to provide sealing of a lubricating region 104 with respect to the free space 46, and consequently with respect to the air gap 33. By contrast with the bearing bushings known from the prior art, the peripheral edge 103 is not interrupted, in order thereby to provide a closure of the lubricating region 104 with respect to the free space 46.

Flow channels 106, which run in the bearing bushing 100 and are formed, for example, as (straight) bores in the latter, open out into the lubricating region 104. A plurality of flow channels 106 are preferably provided in this case, disposed around an inner periphery of the bearing bushing 100 such that they are distributed around the axis of rotation 28. The flow channels 106 have respective corresponding orifices 108, with which they open out directly into the lubricating region 104. The orifices 108 are in this case preferably disposed in the vicinity of the sealing 103 (the peripheral edge) of the flow region 104, so that the flow region 104 can be flowed through over a large area.

The flow channels 106 are in turn connected to the pressure region 58 of the circulating pump 10, so that lubricating fluid can be introduced into the lubricating region 104 from the pressure region 58. In the case of the exemplary embodiment shown, the flow channels 106 extend parallel to the axis of rotation 28 through the bearing bushing 100 and then open out via the orifices 108 into the lubricating region 104. Formed in a wall 109 of the corresponding rotor is an opening 110, which in turn is connected to the flow channel or channels 106. The opening 110 opens out into the pressure region 58 of the circulating pump.

For the removal of lubricating fluid, formed in the bearing bushing 100 is a central lubricating opening 114, which opens out into the suction region 60 of the circulating pump via a channel 116.

In the case of the exemplary embodiment according to FIG. 6, an end of the bearing bushing 100 pointing into the free space 46 lies on the near side of the equatorial plane 76 of the sliding body 38, i.e. above such an equatorial plane.

Lubricating fluid can be transported through the lubricating region 104 via the flow channels 106 and the lubricating opening 114, while bypassing the air gap 33.

This provides the advantages already described above.

In the case of one exemplary embodiment, as schematically shown in FIG. 4, at least one opening 120 is formed between the free space 46 and a separating space 122 ("separating plate space"). The separating space 122 is disposed beneath the impeller space 52, facing the electric motor 14. The separating space 122 and the impeller space 52 are separated by the covering 98 (which is, in particular, a separating plate). The opening 120 thereby opens out into the separating space 122.

Fluid can flow through the opening 120 out of the region 122 into the free space 46. As a result, an approximately closed fluid circuit can be formed by the space 46, the gap 33 and the space 122. The frictional pump allows fluid to be transported via this circuit through the air gap 33, in order in this way to cool the rotor 26 and/or the stator 16. Since this circuit is approximately closed, the problem of the accumulation of magnetic particles does not arise.

Before a circulating pump according to an embodiment of the invention is put into operation, the free space 46 and the region 122 are filled with fluid, so that with the frictional pump the closed circuit can form with a cooling effect.

The foregoing description of embodiments of the invention have been presented for purposes of illustration and description. It is not intended to be exhaustive or to limit the invention to the precise form disclosed, and modifications and variation are possible in light of the above teachings or may be acquired from practice of the invention. The embodiment was chosen and described in order to explain the principles of the invention and its practical application to enable one skilled in the art to utilize the invention in various embodiments and with various modification as are suited to the particular use contemplated. It is intended that the scope of the invention be defined by the claims appended hereto and their equivalents.

What is claimed is:

1. A circulating pump for circulating a fluid, comprising:
   an electric motor with a rotor and a stator and a gap between the stator and the rotor, the rotor being mounted on a spherical bearing, said spherical bearing comprising a sliding body with a convex spherical surface and a bearing bushing with a concave spherical surface, and said spherical bearing being fluid-lubricated by the fluid being circulated,
   a flow system in fluid communication with the fluid being circulated for passing the fluid through a lubricating region between the sliding body and the bearing bushing; and
   a sealing element in direct contact with the sliding body for blocking the fluid in the lubricating region from being in fluid communication with the gap between the stator and the rotor,
   wherein said flow system is separated from the gap between the stator and the rotor.

2. The circulating pump according to claim 1, wherein the flow system bypasses the gap between the stator and the rotor.

3. The circulating pump according to claim 1, wherein the flow system is taken past the gap between the stator and the rotor.

4. The circulating pump according to claim 1, wherein the flow system is adapted to supply lubricating fluid to the lubricating region through the rotor and to selectively remove the lubricating fluid via the rotor.

5. The circulating pump according to claim 1, wherein the flow system is formed in the rotor.

6. The circulating pump according to claim 1, wherein the flow system comprises one or more flow channels disposed in the rotor.

7. The circulating pump according to claim 1, wherein the flow system comprises one or more supply channels for supply of lubricating fluid into the lubricating region, the channels being formed in the rotor.

8. The circulating pump according to claim 1, wherein the lubricating region is closed toward a holder for the sliding body.

9. The circulating pump according to claim 1, wherein the lubricating region is adjoined, away from the bearing bushing, by a space, the lubricating region being sealed with respect to the space.

10. The circulating pump according to claim 9, wherein the sliding body is partly located in the space.

11. The circulating pump according to claim 9, wherein a holder for the sliding body is at least partly disposed in the space.

12. The circulating pump according to claim 9, wherein the space is in effective fluidic connection with the gap between the stator and the rotor.

13. The circulating pump according to claim 9, wherein the sealing element comprises a seal for sealing the lubricating region in relation to the space.

14. The circulating pump according to claim 13, wherein the seal has a peripheral edge facing the sliding body.

15. The circulating pump according to claim 13, wherein the seal engages against the sliding body.

16. The circulating pump according to claim 13, wherein the seal is formed integrally with the bearing bushing.

17. The circulating pump according to claim 13, wherein the seal is disposed on the near side of an equatorial plane of the sliding body.

18. The circulating pump according to claim 13, wherein the seal is disposed on the far side of an equatorial plane of the sliding body.

19. The circulating pump according to claim 1, wherein one or more flow channels open out into the lubricating region.

20. The circulating pump according to claim 19, wherein at least one flow channel opens out laterally with an orifice of the at least one flow channel being aligned transversely in relation to an axis of rotation of the rotor into the lubricating region.

21. The circulating pump according to claim 19, wherein an orifice of the at least one flow channel with which the latter opens out into the lubricating region is aligned transversely in relation to an axis of rotation of the rotor.

22. The circulating pump according to claim 19, wherein the at least one flow channel is disposed in the bearing bushing and/or on the bearing bushing.

23. The circulating pump according to claim 19, wherein an orifice of the at least one flow channel via which lubricating fluid can flow into the flow channel is in effective fluidic connection with a pressure region of the circulating pump.

24. The circulating pump according to claim 1, wherein a lubricating opening is formed in the bearing bushing.

25. The circulating pump according to claim 24, wherein the lubricating opening is aligned with an axis of rotation of the rotor.

26. The circulating pump according to claim 24, wherein the lubricating opening is in effective fluidic connection with a suction region of the circulating pump.

27. The circulating pump according to claim 1, wherein a covering is provided for the gap between the stator and the rotor.

28. The circulating pump according to claim 1, wherein a covering is provided between an impeller and the electric motor.

29. The circulating pump according to claim 27, wherein a separating space is formed between the covering and the electric motor.

30. The circulating pump according to claim 1, wherein the flow system is in effective fluidic connection with a pressure region of the circulating pump and in effective fluidic connection with a suction region, lubricating fluid being able to flow through the lubricating region via at least one flow channel.

31. The circulating pump according to claim 1, wherein a bearing region of the spherical bearing lies between the electric motor and an impeller.

32. The circulating pump according to claim 1, wherein an opening is provided between the space in which a holder for the sliding body is at least partly disposed and a separating space, the separating space lying beneath an impeller space.

33. A circulating pump for circulating a fluid, comprising:
an electric motor with a rotor and a stator and a gap between the stator and the rotor, the rotor being mounted on a spherical bearing, said spherical bearing comprising a sliding body with a convex spherical surface and a bearing bushing with a concave spherical surface, and said spherical bearing being fluid lubricated by the fluid being circulated,
a flow system in fluid communication with the fluid being circulated for passing the fluid through a lubricating region between the sliding body and the bearing bushing; and
a sealing element for blocking the fluid in the lubricating region from being in fluid communication with the gap between the stator and the rotor,
wherein said flow system is separated from the gap between the stator and the rotor, and wherein the lubricating region is adjoined, away from the bearing bushing, by a space, the lubricating region being sealed with respect to the space.

34. The circulating pump according to claim 33, wherein the sliding body is partly located in the space.

35. The circulating pump according to claim 33, wherein a holder for the sliding body is at least partly disposed in the space.

36. The circulating pump according to claim 33, wherein the space is in effective fluidic connection with the gap between the stator and the rotor.

37. The circulating pump according to claim 33, wherein the sealing element comprises a seal for sealing the lubricating region in relation to the space.

38. The circulating pump according to claim 37, wherein the seal has a peripheral edge facing the sliding body.

39. The circulating pump according to claim 37, wherein the seal engages against the sliding body.

40. The circulating pump according to claim 37, wherein the seal is formed integrally with the bearing bushing.

41. The circulating pump according to claim 1, wherein the lubricating region is closed at an axial end between the sliding body and the bearing bushing.

* * * * *